(12) United States Patent
Srivastav et al.

(10) Patent No.: US 10,114,580 B1
(45) Date of Patent: Oct. 30, 2018

(54) DATA BACKUP MANAGEMENT ON DISTRIBUTED STORAGE SYSTEMS

(71) Applicant: EMC Corporation, Hopkinton, MA (US)

(72) Inventors: Shashwat Srivastav, Seattle, WA (US); Sriram Sankaran, Redmond, WA (US); Vishrut Shah, Redmond, WA (US); Qi Zhang, Redmond, WA (US); Jun Luo, Bellevue, WA (US); Chen Wang, Shanghai (CN); Subba R. Gaddamadugu, Worcester, MA (US); Peter M. Musial, Arlington, MA (US); Andrew D. Robertson, Washington, DC (US); Huapeng Yuan, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/319,383

(22) Filed: Jun. 30, 2014

Related U.S. Application Data

(60) Provisional application No. 61/988,796, filed on May 5, 2014, provisional application No. 61/988,603, filed on May 5, 2014.

(51) Int. Cl.
*G06F 12/00* (2006.01)
*G06F 13/00* (2006.01)
(Continued)

(52) U.S. Cl.
CPC .............. *G06F 3/065* (2013.01); *G06F 3/067* (2013.01); *G06F 3/0619* (2013.01)

(58) Field of Classification Search
CPC .... G06F 3/0601; G06F 3/0602; G06F 3/0604; G06F 3/0605; G06F 3/0614;
(Continued)

(56) References Cited

U.S. PATENT DOCUMENTS

| 7,103,824 B2 * | 9/2006 | Halford ............... G06F 11/1076 714/759 |
| 7,499,980 B2 * | 3/2009 | Gusler .................. G06F 3/0608 709/203 |

(Continued)

OTHER PUBLICATIONS

The Designs of RAID with XOR Engines on Disks for Mass Storage Systems; Chang et al; Sixth NASA Goddard Space Flight Center Conference on Mass Storage Systems and Technologies, Fifteenth IEEE Symposium on Mass Storage Systems; Mar. 23-26, 1998; retrieved from http://storageconference.org/nasa/conf1998.html on Oct. 23, 2015 (5 pages).*

(Continued)

*Primary Examiner* — Daniel C Chappell
(74) *Attorney, Agent, or Firm* — Krishnendu Gupta

(57) ABSTRACT

A computer-executable method, computer program product, and system for managing backups in a distributed data storage system including a first zone, a second zone, and a third zone, the computer-executable method, computer program product, and system comprising processing, at the third zone, a first portion of data of the first zone and a second portion of data of the second zone to create a combined portion of data, and removing the first portion and second portion from the third zone.

15 Claims, 13 Drawing Sheets

(51) Int. Cl.
*G06F 13/28* (2006.01)
*G06F 3/06* (2006.01)

(58) Field of Classification Search
CPC .... G06F 3/0619; G06F 3/0628; G06F 3/0629;
G06F 3/0631; G06F 3/0644; G06F 3/067;
G06F 3/0671; G06F 3/0673; G06F
3/0674; G06F 3/0676; G06F 3/0677;
G06F 3/0679; G06F 3/068; G06F 3/0682;
G06F 3/0683; G06F 3/0685; G06F
3/0686; G06F 3/0688; G06F 3/0689;
G06F 11/00; G06F 11/08; G06F 11/10;
G06F 11/1004; G06F 11/1008; G06F
11/1012; G06F 11/1016; G06F 11/102;
G06F 11/1024; G06F 11/1028; G06F
11/1032; G06F 11/1036; G06F 11/104;
G06F 11/1044; G06F 11/1048; G06F
11/1052; G06F 11/1056; G06F 11/106;
G06F 11/1064; G06F 11/1068; G06F
11/1072; G06F 11/1076; G06F 11/108;
G06F 11/1084; G06F 11/1088; G06F
11/1092; G06F 11/1096; G06F 11/14;
G06F 11/1402; G06F 11/16; G06F 12/02
See application file for complete search history.

(56) References Cited

U.S. PATENT DOCUMENTS

| | | | | |
|---|---|---|---|---|
| 8,307,026 | B2* | 11/2012 | Gusler | G06F 9/5011 |
| | | | | 709/200 |
| 8,510,279 | B1* | 8/2013 | Natanzon | G06F 17/30073 |
| | | | | 707/697 |
| 8,645,749 | B2* | 2/2014 | Reche | G06F 11/108 |
| | | | | 714/6.1 |
| 8,806,160 | B2* | 8/2014 | Colgrove | G06F 3/0608 |
| | | | | 711/162 |
| 8,910,030 | B2* | 12/2014 | Goel | G06F 11/1076 |
| | | | | 714/763 |
| 9,529,542 | B2* | 12/2016 | Friedman | G06F 3/0619 |
| 9,535,802 | B2* | 1/2017 | Tsafrir | G06F 11/1088 |
| 9,690,501 | B1* | 6/2017 | Chopra | G06F 3/0619 |
| 9,781,227 | B2* | 10/2017 | Friedman | H04L 67/2842 |
| 9,880,746 | B1* | 1/2018 | Shilane | G06F 3/061 |
| 9,880,902 | B2* | 1/2018 | Baptist | G06F 11/1076 |
| 9,967,298 | B2* | 5/2018 | Barton | H04L 65/403 |
| 2008/0005475 | A1* | 1/2008 | Lubbers | G06F 3/0613 |
| | | | | 711/118 |
| 2009/0157991 | A1* | 6/2009 | Rajan | G06F 11/008 |
| | | | | 711/162 |
| 2010/0180153 | A1* | 7/2010 | Jernigan, IV | G06F 11/1076 |
| | | | | 714/6.12 |
| 2013/0304987 | A1* | 11/2013 | Goel | G06F 11/1076 |
| | | | | 711/114 |

OTHER PUBLICATIONS

XOR Support in the Disk Drives.; Olstenius, Johan; Computer Technology Review, Mar. 1, 2000; retrieved from http://www.thefreelibrary.com/XOR+SUPPORT+IN+THE+DISK+DRIVES.-a061620918 on Oct. 24, 2015 (4 pages).*
How RAID 5 actually works; Nobel, Rickard; Jul. 26, 2011; retrieved from http://rickardnobel.se/how-raid5-works/ on Oct. 24, 2015 (5 pages).*
How does RAID 5 work? The Shortest and Easiest explanation ever!; Janusz Bak; Apr. 22, 2014; retrieved from https://web.archive.org/web/20140422133815/http://blog.open-e.com/how-does-raid-5-work/ on Aug. 24, 2016 (7 pages).*
Definition of extraneous; Merriam-Webster Dictionary; retrieved from https://www.merriam-webster.com/dictionary/extraneous on Feb. 2, 2018 (2 pages).*
Performance analysis and framework optimization of open source cloud storage system; Li et al.; China Communications, vol. 13, iss. 6; Jun. 2016; pp. 110-122 (Year: 2016).*
Parity Redundancy in a Clustered Storage System; Narayan et al.; International Workshop on Storage Network Architecture and Parallel I/Os; Sep. 24, 2004; pp. 17-24 (Year: 2004).*

* cited by examiner

DATA BACKUP MANAGEMENT ON DISTRIBUTED STORAGE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application claims priority from U.S. Provisional Patent Application Ser. Nos. 61/988,603 entitled "DISTRIBUTED DATA STORAGE MANAGEMENT" and 61/988,796 entitled "ZONE CONSISTENCY" filed on May 5, 2014 the content and teachings of which are hereby incorporated by reference in their entirety.

This Application is related to U.S. patent application Ser. No. 14/319,349 entitled "DISTRIBUTED DATA STORAGE MANAGEMENT", Ser. No. 14/319,360 entitled "DISTRIBUTED METADATA MANAGEMENT", Ser. No. 14/319,368 entitled "SCALABLE DISTRIBUTED STORAGE SYSTEM INFRASTRUCTURE", Ser. No. 14/319,378 entitled "DISTRIBUTED DATA STORAGE MANAGEMENT", Ser. No. 14/319,113 entitled "ZONE CONSISTENCY", and Ser. No. 14/319,117 entitled "ZONE CONSISTENCY" filed on even date herewith, the teachings of which applications are hereby incorporated herein by reference in their entirety.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, computer program product, and system for managing backups in a distributed data storage system including a first zone, a second zone, and a third zone, the computer-executable method, computer program product, and system comprising processing, at the third zone, a first portion of data of the first zone and a second portion of data of the second zone to create a combined portion of data, and removing the first portion and second portion from the third zone.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
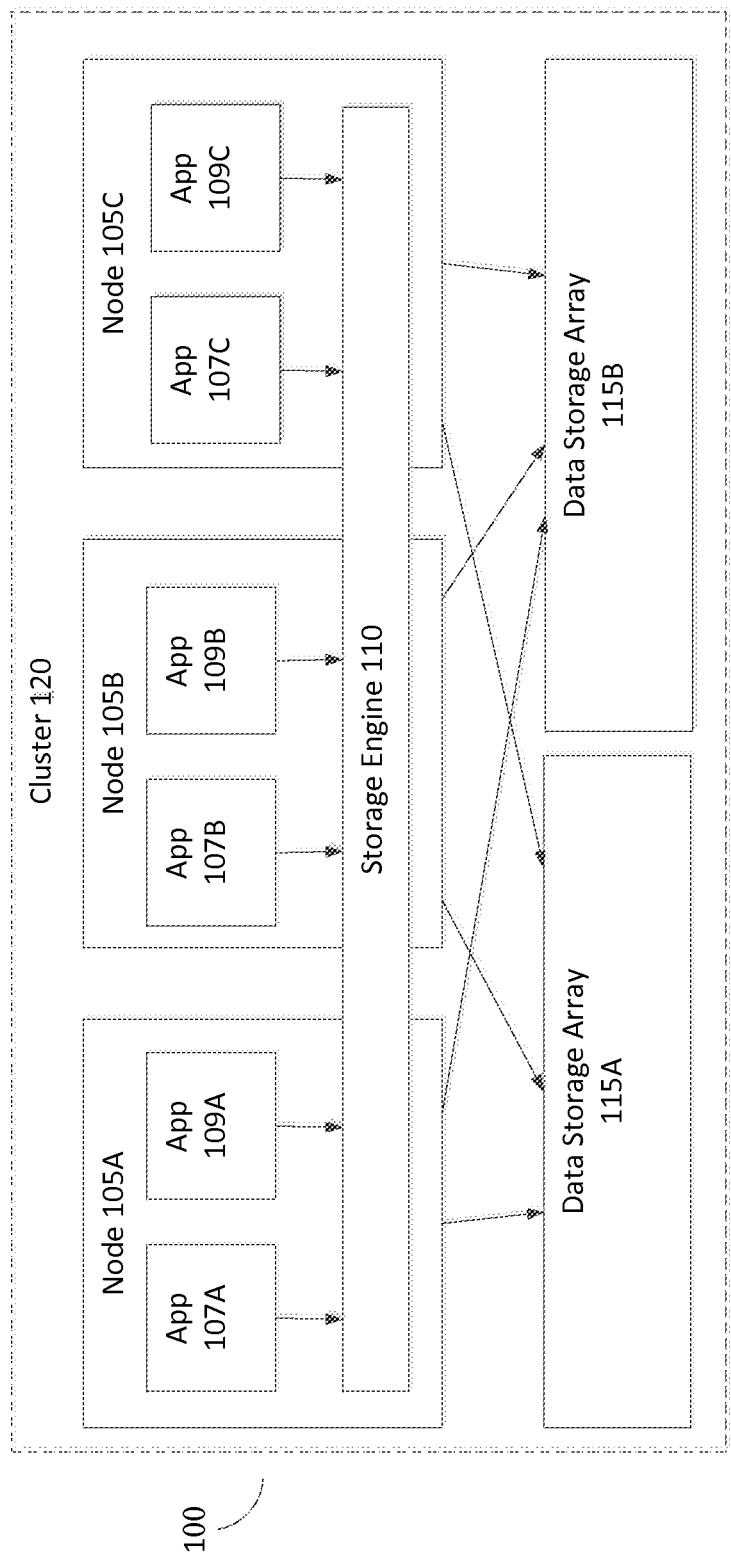
FIG. 1 is a simplified illustration of a distributed data storage system, in accordance with an embodiment of the present disclosure.

Traditionally, distributed data storage systems are managed by a single node and/or module within the distributed data storage system. Conventionally, control by a single node makes a distributed data storage system vulnerable to downtime due to node failure. Typically, control by a single node makes a distributed data storage system constrained by an ability of a single node to manage data I/O requests made within the distributed data storage system. Conventionally, improving the ability to manage data I/O requests within a distributed data storage system would be beneficial to the data storage system industry.

In many embodiments, the current disclose may enable a distributed data storage system to create redundant backups within the distributed data storage system. In various embodiments, the current disclosure may enable creation of redundant backups while minimizing use of data storage space within a distributed data storage system. In certain embodiments, the current disclosure may enable a distributed data storage system to recover data from failure of one or more portions of a distributed data storage system. In other embodiments, the current disclosure may enable a distributed data storage system to recover data from a failure of one or more nodes in the distributed data storage system. In most embodiments, the current disclosure may enable a distributed data storage system to recover data from a failure of a zone and/or cluster in a distributed data storage system.

In many embodiments, a distributed data storage system may include one or more zones and/or clusters. In various embodiments, a zone and/or cluster may include one or more compute nodes and one or more data storage arrays. In certain embodiments, a zone and/or cluster may be enabled to communicate with one or more zones and/or clusters in the distributed data storage systems. In most embodiments, a zone and/or cluster may be enabled to manage and/or store data chunk format. In various embodiments, chunk format may include file and object storage formats. In other embodiments, chunk format may be portions of data storage of a specified size (i.e. 64 MB/125 MB).

In many embodiments, a compute node in a distributed data storage system may include a storage engine. In some embodiments, a storage engine may enable communication between one or more compute nodes in a distributed data storage system. In certain embodiments, a storage engine may enable a distributed data storage system to conduct cluster-wide and/or zone-wide activities, such as creating backups and/or redundancies in a zone. In other embodiments, a storage engine may enable a distributed data storage system to conduct system-wide activities which may enable creation of redundancies and/or backups to handle one or more zones and/or clusters to fail while maintaining data integrity across the entire system. In most embodiments, a storage engine may include one or more layers. In various embodiments, layers within a storage engine may include a transaction layer, index layer, chunk management layer, storage server management layer, partitions record layer, and/or a storage server (Chunk I/O) layer. In certain embodiments, a transaction layer may parse received object request from applications within a distributed data storage system. In most embodiments, a transaction layer may be enable to read and/or write object data to the distributed data storage system. In many embodiments, an index layer may be enabled to map file-name/data-range to data stored within the distributed data storage system. In various embodiments, an index layer may be enabled to manage secondary indices which may be used to manage data stored on the distributed data storage system.

In embodiments, a chunk management layer may manage chunk information, such as, but not limited to, location and/or management of chunk metadata. In various embodiments, a chunk management layer may be enabled to execute per chunk operations. In certain embodiments, a storage server management layer may monitor the storage server and associated disks. In most embodiments, a storage server management layer may be enabled to detect hardware failures and notify other management services of failures within the distributed data storage system. In some embodiments, a partitions record layer may record an owner node of a partition of a distributed data storage system. In many embodiments, a partitions record layer may record metadata of partitions, which may be in a B+tree and journal format. In most embodiments, a storage server layer may be enabled to direct I/O operations to one or more data storage arrays within the distributed data storage system.

In many embodiments, a zone may be enabled to create efficient backups for other zones in a distributed data storage system. In various embodiments, a zone may be enabled to combine backups from multiple zones to create a single backup of combined data that may take the same, or less, space as the backups being combined. In certain embodiments, an XOR operation may be used to combine two or more backups into a single backup. In most embodiments, once a combined backup has been created, a distributed data storage system may remove the unneeded uncombined backups. In some embodiments, a zone and a cluster may equate to the same constructs in a distributed data storage system. In most embodiments, combined XOR data blocks may be created by encoding data from two or more zones. In various embodiments, a system including N zones (where N>=3), an XOR combined block may include N−1 portions of data from the N zones which may enable more data storage to be conserved as the number of zones increases.

Refer to the example embodiment of FIG. 1. FIG. 1 is a simplified illustration of a distributed data storage system, in accordance with an embodiment of the present disclosure. As shown, distributed data storage system 100 includes cluster 120 which includes Node (105A-C, 105 Generally), and Data Storage Arrays (115A-B, 115 Generally). Node 105A is in communication with data storage array 115A and Data storage Array 115B. Node 105B is in communication with data storage array 115A and 115B. Node 105C is in communication with data storage array 115A and Data storage Array 115B. In FIG. 1, storage engine 110 is executed on each node 105. storage engine 110 enables Applications 107A, 109A, 107B, 109B, 107C, 109C to execute data I/O requests to and from distributed data storage system 100. In various embodiments, a distributed data storage system may include one or more clusters which may be located in one or more locations.

Figure 2:
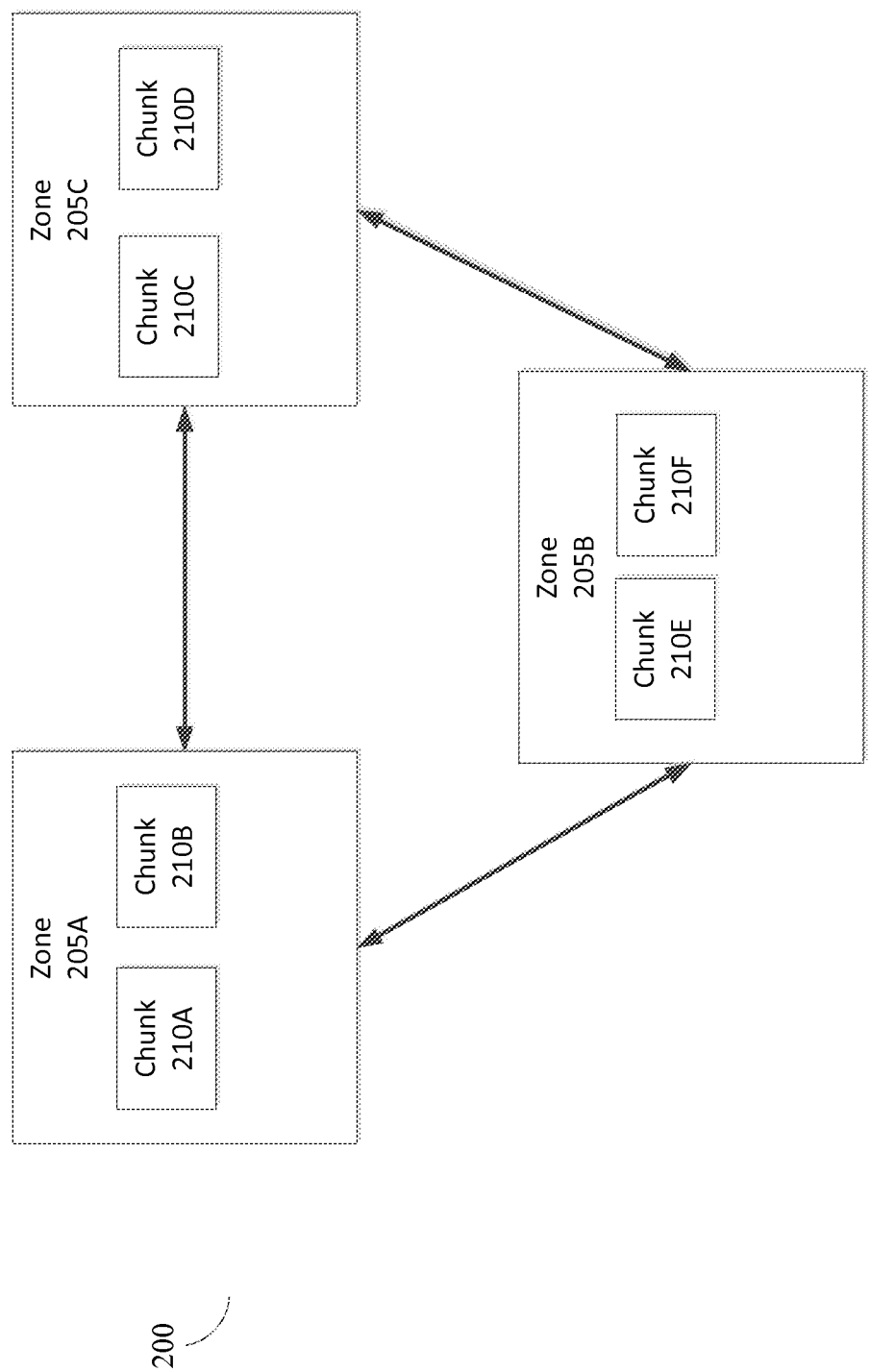
FIG. 2 is a simplified illustration of a distributed data storage system, in accordance with an embodiment of the present disclosure.

Refer to the example embodiment of FIG. 2. FIG. 2 is a simplified illustration of a distributed data storage system, in accordance with an embodiment of the present disclosure. As shown, distributed data storage system 200 includes zones (205A-C, 205 Generally). Zones 205 include one or more clusters which contain one or more nodes enabled to manage data storage on data storage arrays. Zone 205A is managing chunk 210A and chunk 210B stored on data storage arrays within zone 205A. Zone 205B is managing chunk 210E and chunk 210F stored on data storage arrays within zone 205B. Zone 205C is managing chunk 210C and chunk 210D stored on data storage arrays within zone 205C. Zone 205A is in communication with zone 205B and zone 205C. Zone 205B is in communication with Zone 205A and zone 205C. Zone 205C is in communication with Zone 205A and zone 205B. In many embodiments, each zone may manage backups and/or redundant storage within their own zone.

Figure 3:
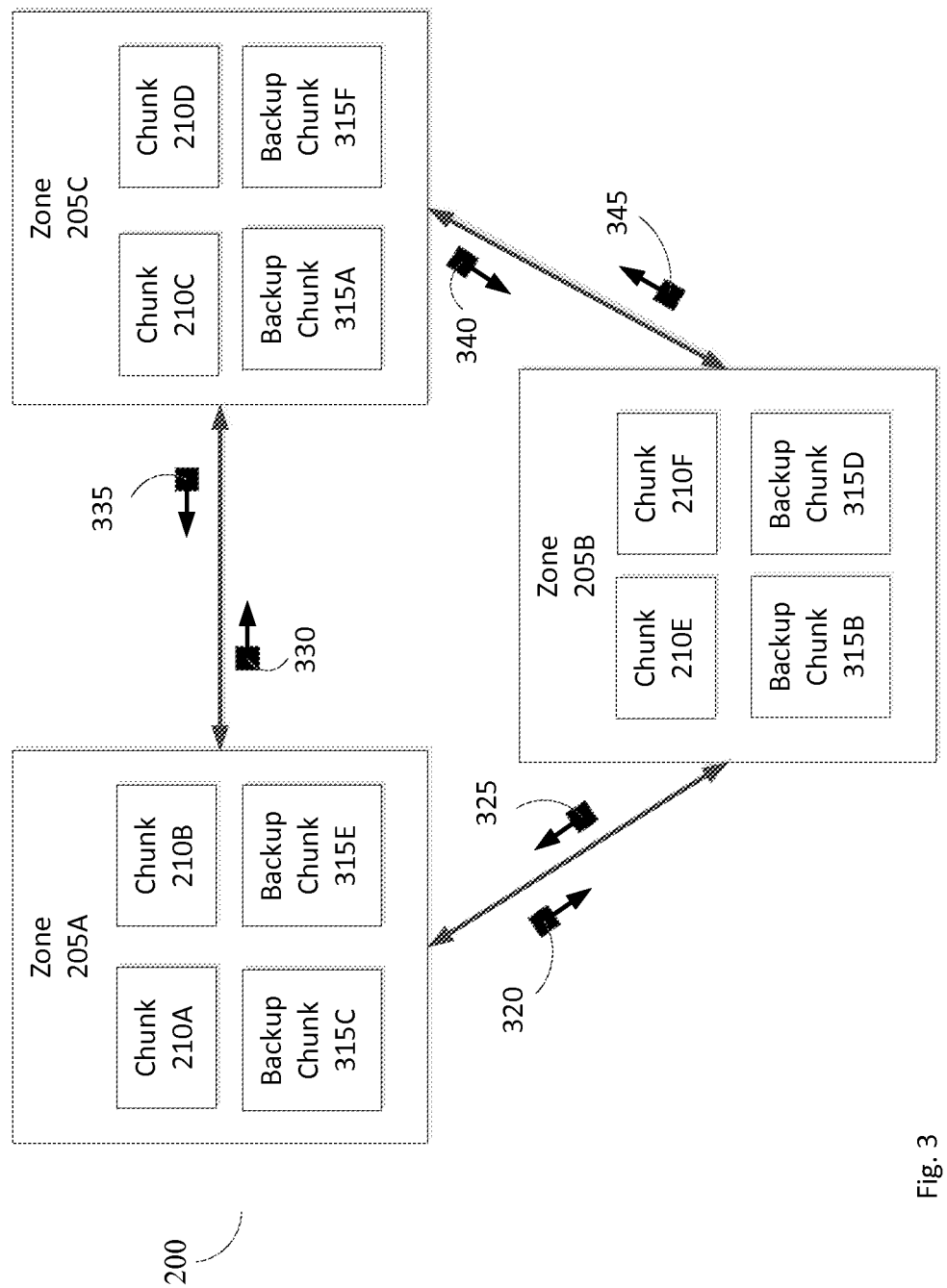
FIG. 3 is a simplified illustration of a distributed data storage system backing up portions of data, in accordance with an embodiment of the present disclosure.
Figure 4:
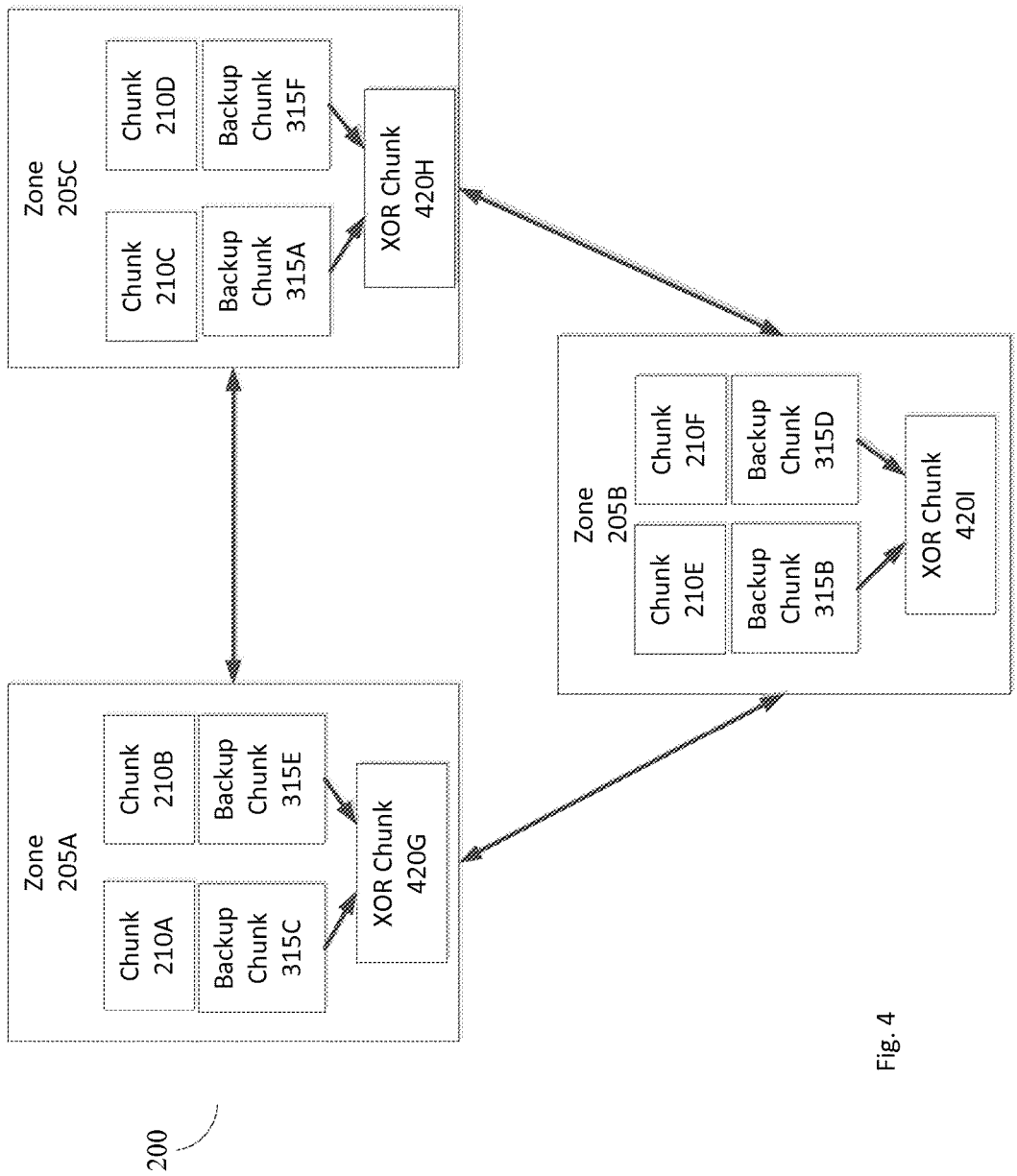
FIG. 4 is a simplified illustration of a distributed data storage system reducing the amount of backup data stored, in accordance with an embodiment of the present disclosure.

Refer to the example embodiment of FIG. 3. FIG. 3 is a simplified illustration of a distributed data storage system backing up portions of data, in accordance with an embodiment of the present disclosure. As shown, Zone 205A sends message 330 to zone 205C to backup chunk 210A at zone 205C as backup chunk 315A. Backup chunk 315A has the same identifier as chunk 210A. Zone 205A sends message 320 to zone 205B to backup chunk 210B as backup chunk 315B. backup chunk 315B has the same identifier as chunk 210B As shown, Zone 205B sends message 345 to zone 205C to backup chunk 210F at zone 205C as backup chunk 315F. Backup chunk 315F has the same identifier as chunk 210F. In many embodiments, chunks and backup chunks may have the same identifier to identify each respective chunk as being associated with another chunk with the same identifier. Zone 205B sends message 325 to zone 205A to backup chunk 210E as backup chunk 315E. Backup chunk 315E has the same identifier as chunk 210E. As shown, Zone 205C sends message 335 to zone 205A to backup chunk 210C at zone 205A as backup chunk 315C. Backup chunk 315C has the same identifier as chunk 210C. Zone 205C sends message 340 to zone 205B to backup chunk 210D as backup chunk 315D. Backup chunk 315D has the same identifier as chunk 210D Refer to the example embodiment of FIG. 4. FIG. 4 is a simplified illustration of a distributed data storage system reducing the amount of backup data stored, in accordance with an embodiment of the present disclosure. In this embodiment, distributed data storage system 200 includes zone 205A, 205B, 205C. Zone 205A executes an XOR operation on backup chunk 315C and backup chunk 315E to create XOR chunk 420G. Zone 205B executes an XOR on backup chunk 315B and backup chunk 315D to create XOR chunk 420I. Zone 205C executes an XOR on backup chunk 315A and backup chunk 315F to create XOR chunk 420H. In this embodiment, XOR chunk 420G is the same size as backup chunk 315C and backup chunk 315E. XOR chunk 420H is the same size as backup chunk 315A and backup chunk 315F. XOR chunk 420I is the same size as backup chunk 315B and backup chunk 315D. In many embodiments, an XOR chunk may enable a distributed data storage system to reproduce one of the input chunks given availability of the remaining input chunks used to create the XOR chunk.

Figure 5:
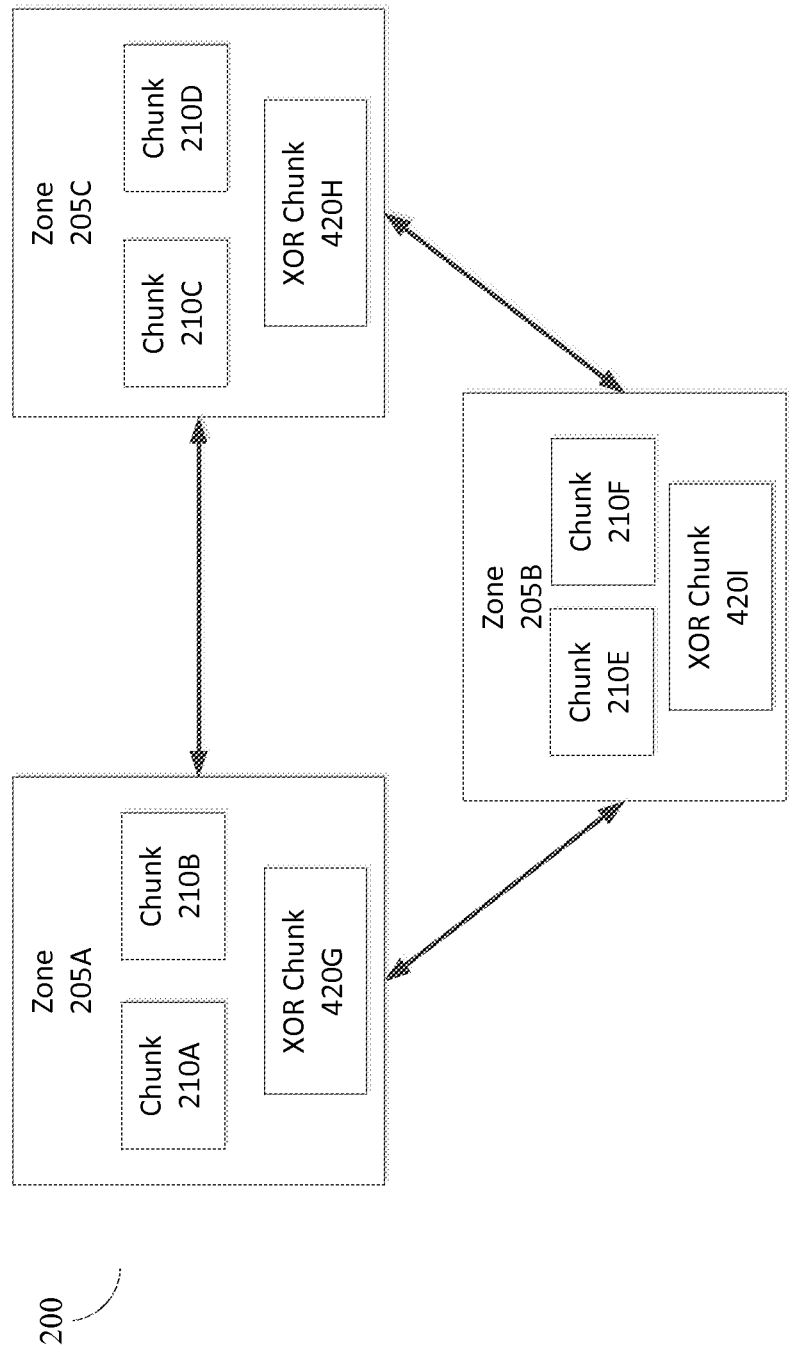
FIG. 5 is a simplified illustration of a distributed data storage system reducing the amount of backup data stored, in accordance with an embodiment of the present disclosure.

Refer to the example embodiment of FIG. 5. FIG. 5 is a simplified illustration of a distributed data storage system reducing the amount of backup data stored, in accordance with an embodiment of the present disclosure. As shown, zones 205 remove extraneous backup chunks. XOR chunks 420G, 420H, 420I enable distributed data storage system 200 to recover one or more chunks within distributed data storage system 200 if one of zones 205A, 205B, 205C fails.

Figure 6:
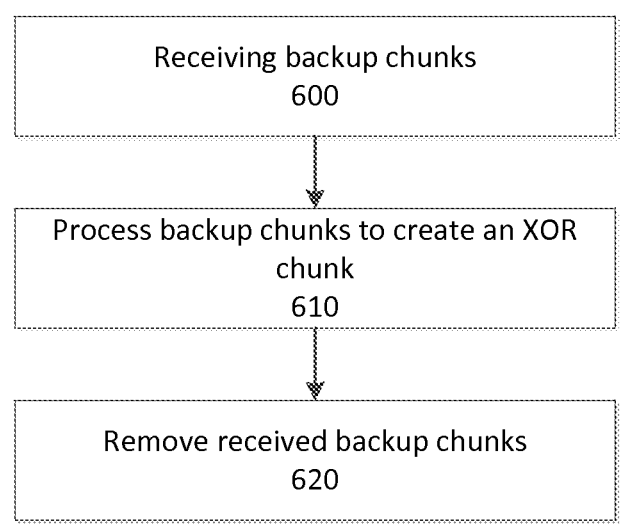
FIG. 6 is a simplified flowchart of a method of reducing used storage space for backups in the distributed data storage system of FIG. 4, in accordance with an embodiment of the present disclosure.

Refer to the example embodiment of FIGS. 4 and 6. FIG. 6 is a simplified flowchart of a method of reducing used storage space for backups in the distributed data storage system of FIG. 4, in accordance with an embodiment of the present disclosure. As shown, distributed data storage system 200 includes zone 205A, zone 205C, and zone 205B. Zone 205A is in communication with Zone 205B and Zone 205C. Zone 205B is in communication with Zone 205A and Zone 205C. Zone 205C is in communication with zone 205A and Zone 205B. Zone 205A has received backup chunk 315C from zone 205C and received backup chunk 315E from Zone 205B (Step 600). Zone 205A processes backup chunk 315C and backup chunk 315E to create XOR chunk 420G (Step 610). Zone 205A removes backup chunk 315C and backup chunk 315E (Step 620).

Figure 7:
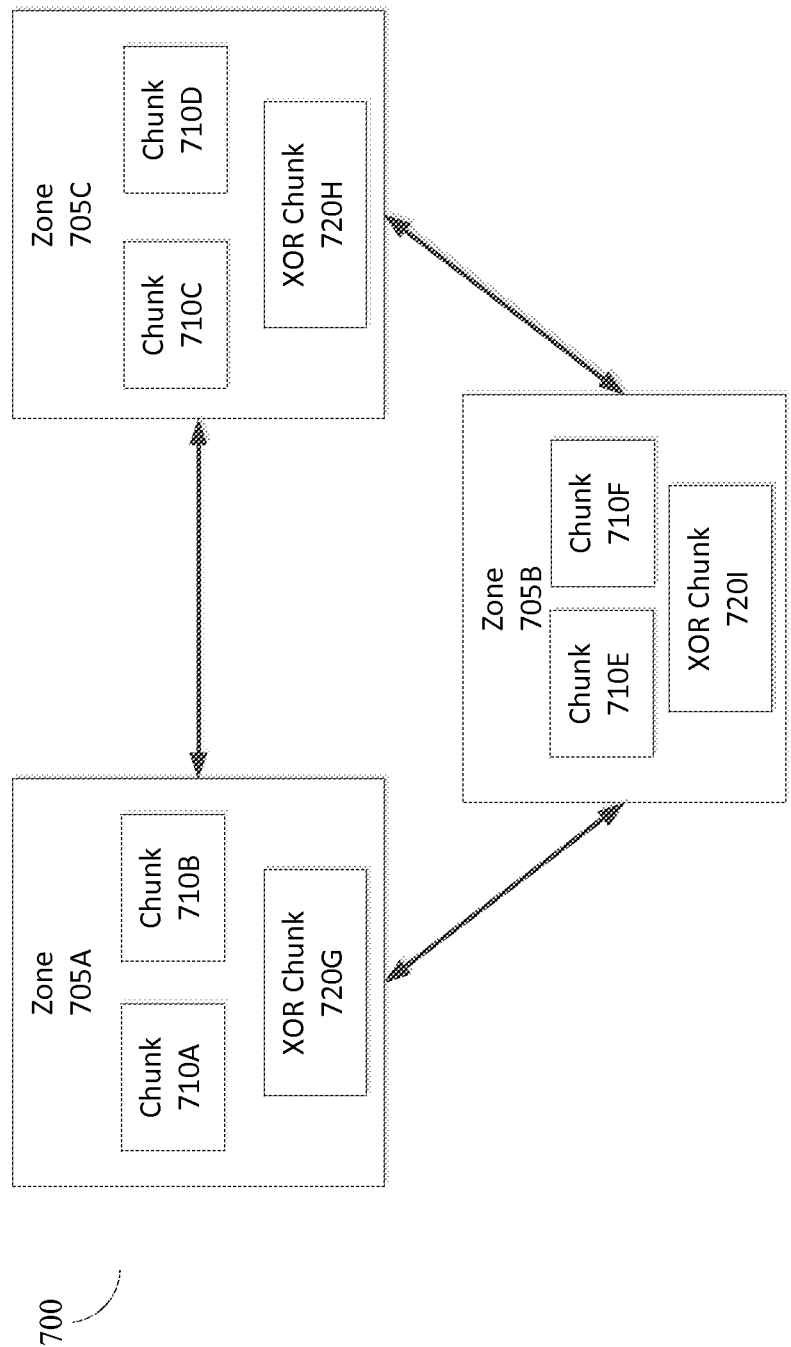
FIG. 7 is a simplified illustration of a distributed data storage system, in accordance with an embodiment of the present disclosure.

Refer to the example embodiment of FIG. 7. FIG. 7 is a simplified illustration of a distributed data storage system, in accordance with an embodiment of the present disclosure. As shown, distributed data storage system (DDSS) 700 includes zones 705A, 705B, 705C. Zone 705A includes chunk 710A, 710B, and XOR chunk 720G. Zone B includes chunk 710E, 710F and XOR chunk 720I. Zone 705C includes chunks 710C, 710D, and XOR chunk 720H. In this embodiment, Zone 705A is in communication with Zone 705C and Zone 705B. Zone 705B is in communication with Zone 705A and Zone 705C. Zone 705C is in communication with Zone 705A and Zone 705B.

Figure 8:
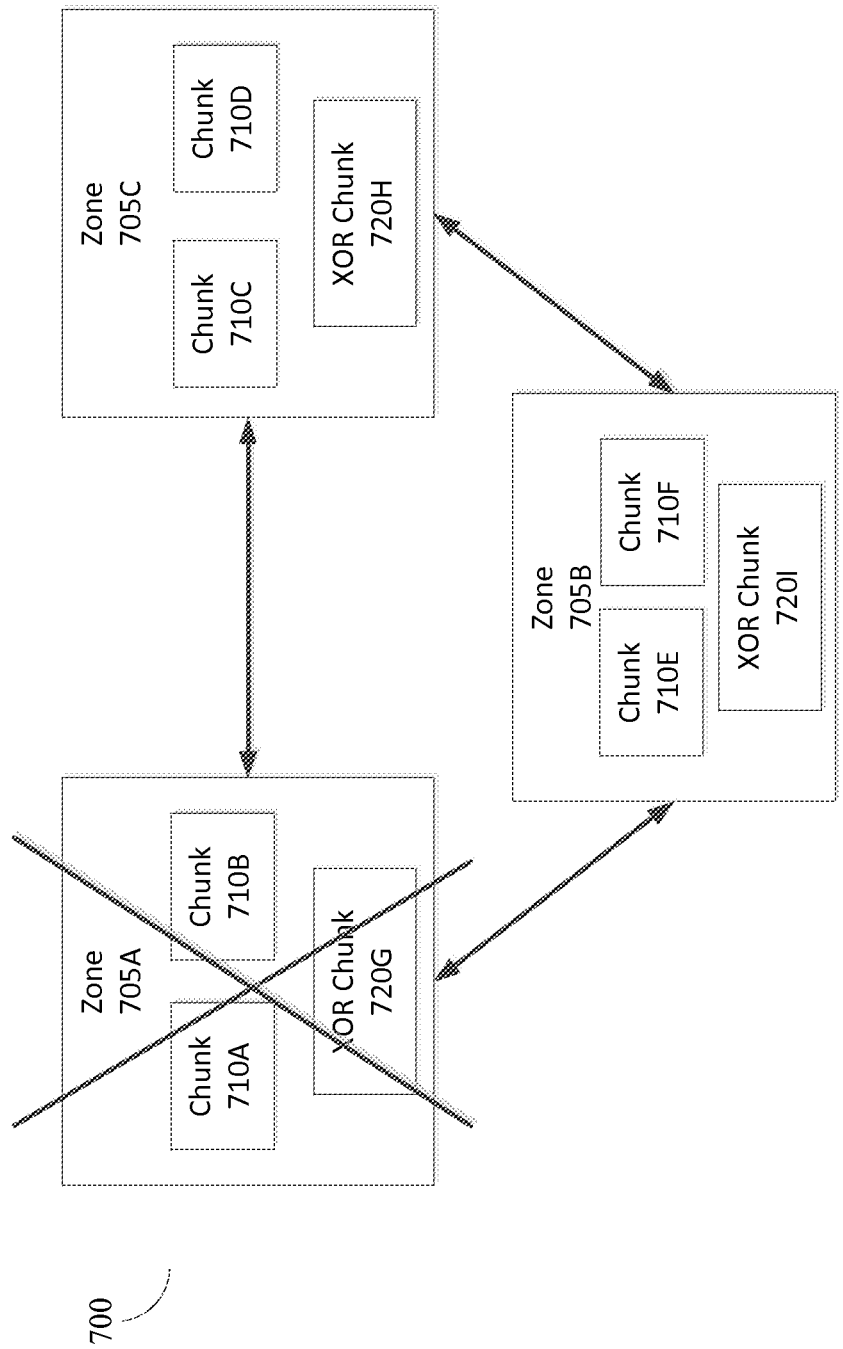
FIG. 8 is a simplified illustration of a Zone failure in a distributed data storage system, in accordance with an embodiment of the present disclosure.

Refer to the example embodiment of FIG. 8. FIG. 8 is a simplified illustration of a Zone failure in a distributed data storage system, in accordance with an embodiment of the present disclosure. As shown, Distributed Data Storage System 700 includes zone 705A, 705C, 705B. In this embodiment, zone 705A has failed and zones 705B, 705C no longer have access to data on zone 705A.

Figure 9:
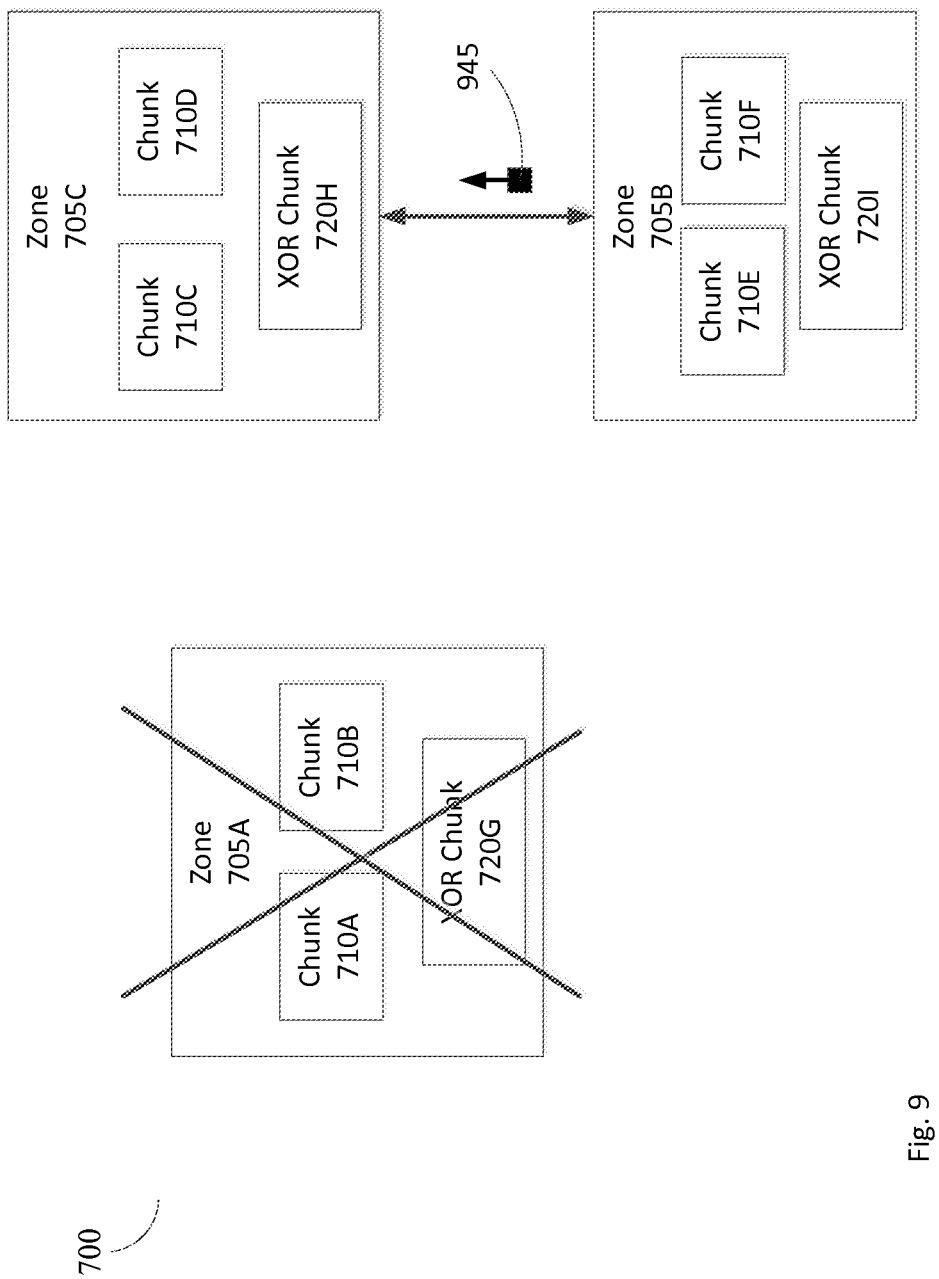
FIG. 9 is a simplified illustration of failover processing in a distributed data storage system, in accordance with an embodiment of the present disclosure.

Refer to the example embodiment of FIG. 9. FIG. 9 is a simplified illustration of failover processing in a distributed data storage system, in accordance with an embodiment of the present disclosure. As shown, Distributed Data Storage System 700 has received a request to reproduce chunk 710A, however, zone 705A has failed and is unable to be queried for data. Distributed data storage system 700 determines that Chunk 710A is enabled to be reproduced at zone 705C using XOR chunk 720H and Chunk 710F. Distributed data storage system 700 directs Zone 705B to sends chunk 710F to zone 705C using message 945.

Figure 10:
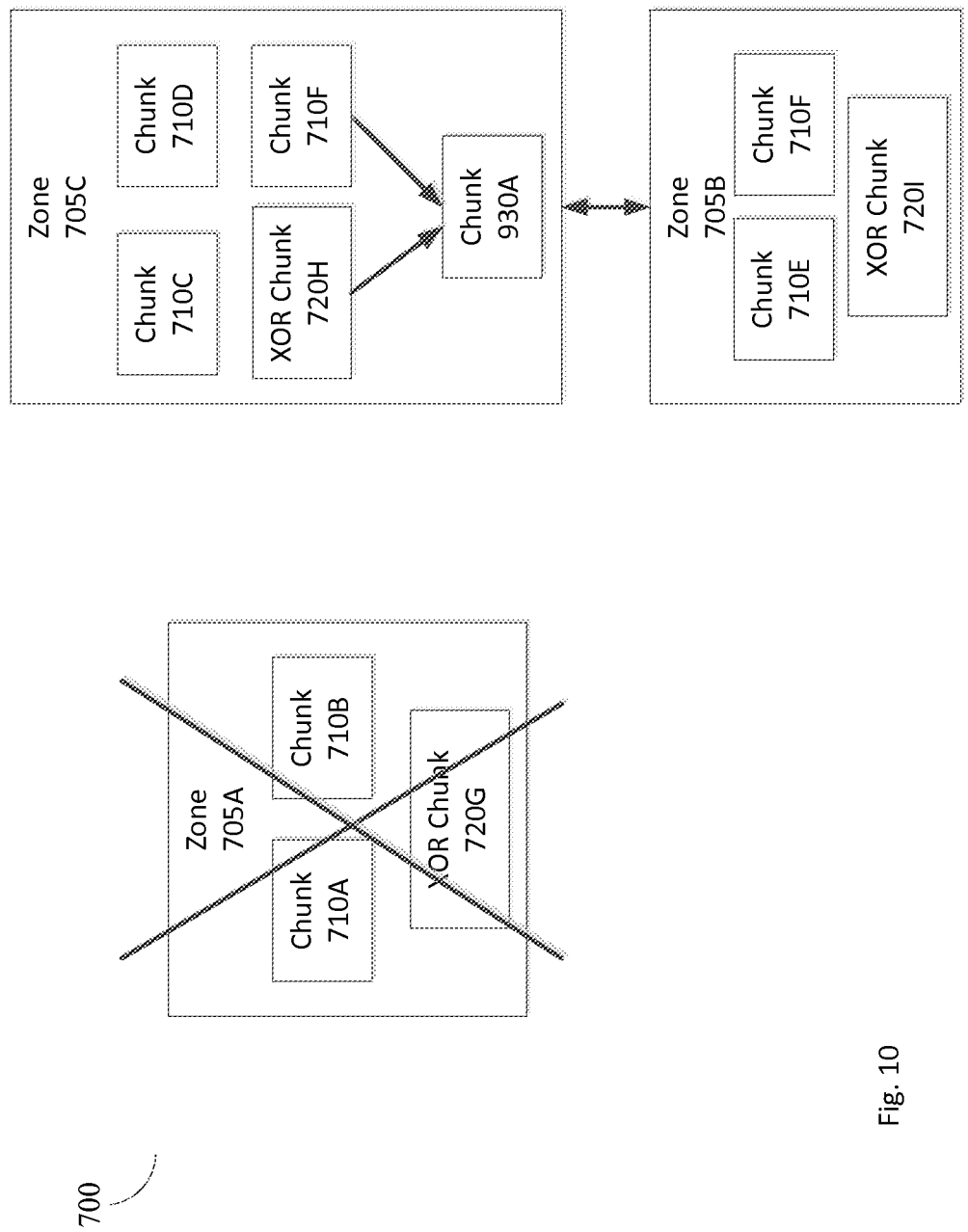
FIG. 10 is a simplified illustration of a distributed data storage system recovering backup data during failover processing, in accordance with an embodiment of the present disclosure.

Refer to the example embodiment of FIG. 10. FIG. 10 is a simplified illustration of a distributed data storage system recovering backup data during failover processing, in accordance with an embodiment of the present disclosure. As shown, zone 705C received chunk 710F from zone 705B. Zone 705C processes XOR chunk 720H and chunk 710F to produce chunk 930A which is chunk 710A.

Figure 11:
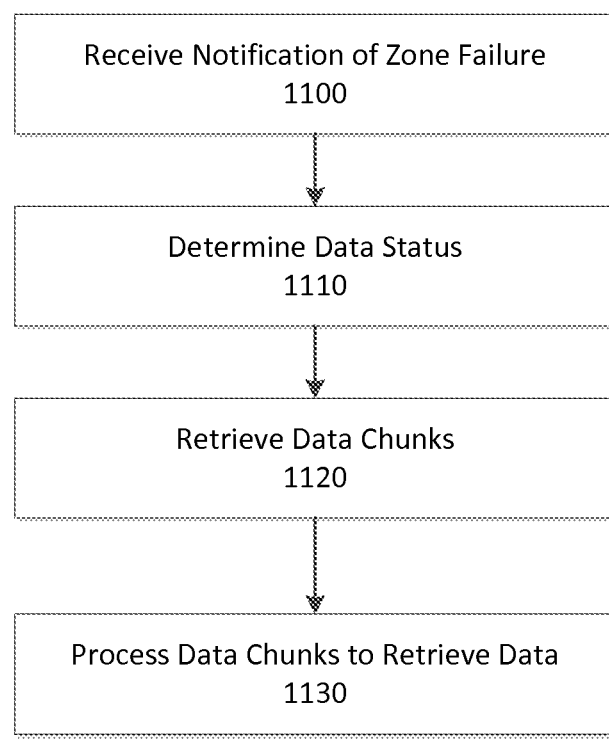
FIG. 11 is a simplified flowchart of a method of recovering data during a failover event as shown in FIG. 10, in accordance with an embodiment of the present disclosure.

Refer to the example embodiments of FIGS. 10 and 11. FIG. 11 is a simplified flowchart of a method of recovering data during a failover event as shown in FIG. 10, in accordance with an embodiment of the present disclosure. In this embodiment, distributed data storage system 700 includes Zone 705A, Zone 705B, and Zone 705C. A failure in distributed data storage system 700 has occurred and Zone 705A has experienced a permanent failure. Upon receiving a notification of zone failure 710A (Step 1100), distributed data storage system 700 determines the status of chunk 710A (Step 1110) located on failed zone 705A. Distributed data storage system 700 determines that XOR Chunk 720H is enabled to support retrieving chunk 710A. To process future data I/O requests, Zone 705C retrieves Chunk 710F from Zone 705B (Step 1120). Zone 705C processes XOR Chunk 720H and retrieved chunk 710F to produce Chunk 930A, which is chunk 710A (Step 1130). Zone 705C responds is enabled to respond to data I/O requests for Chunk 710A with chunk 930A. Similarly, XOR Chunk 720I is enabled to be used to retrieve Chunk 710B in a similar manner.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 12:
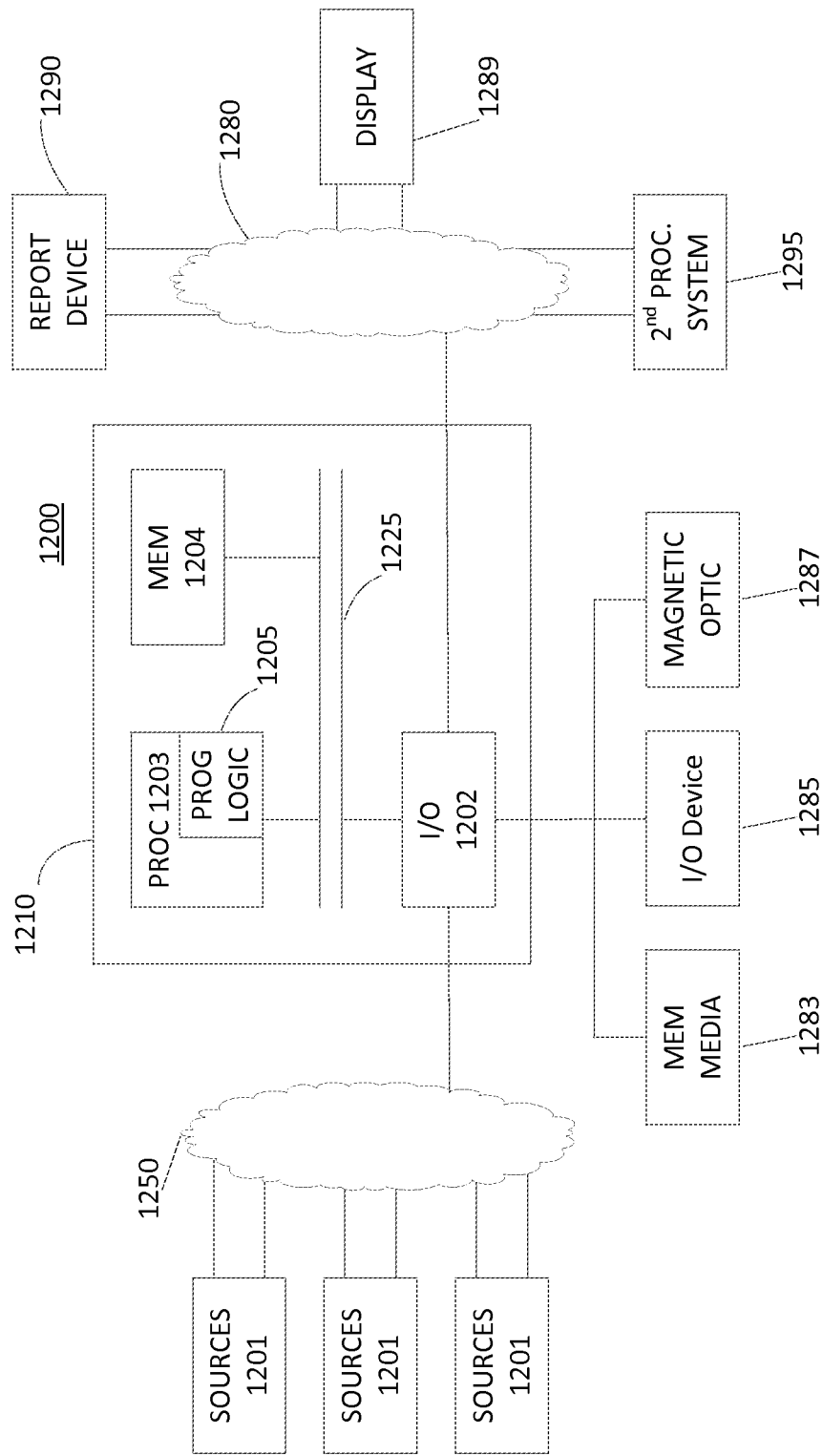
FIG. 12 is an example of an embodiment of an apparatus that may utilize the techniques described herein, in accordance with an embodiment of the present disclosure.

FIG. 12 is a block diagram illustrating an apparatus, such as a computer 1210 in a network 1200, which may utilize the techniques described herein according to an example embodiment of the present invention. The computer 1210 may include one or more I/O ports 1202, a processor 1203, and memory 1204, all of which may be connected by an interconnect 1225, such as a bus. Processor 1203 may include program logic 1205. The I/O port 1202 may provide connectivity to memory media 1283, I/O devices 1285, and drives 1287, such as magnetic or optical drives. When the program code is loaded into memory 704 and executed by the computer 1210, the machine becomes an apparatus for practicing the invention. When implemented on one or more general-purpose processors 1203, the program code combines with such a processor to provide a unique apparatus that operates analogously to specific logic circuits. As such, a general purpose digital machine can be transformed into a special purpose digital machine.

Figure 13:
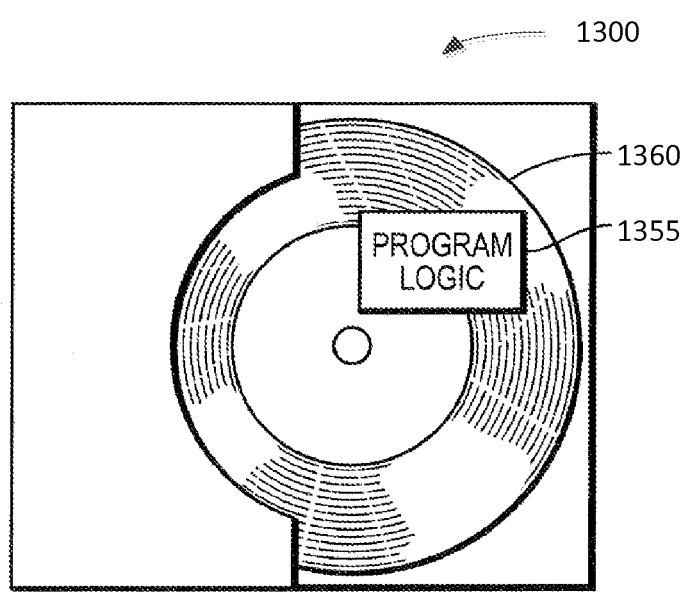
FIG. 13 is an example of a method embodied on a computer readable storage medium that may utilize the techniques described herein, in accordance with an embodiment of the present disclosure.

FIG. 13 is a block diagram illustrating a method embodied on a computer readable storage medium 1360 that may utilize the techniques described herein according to an example embodiment of the present invention. FIG. 13 shows Program Logic 1355 embodied on a computer-readable medium 1360 as shown, and wherein the Logic is encoded in computer-executable code configured for carrying out the methods of this invention and thereby forming a Computer Program Product 1300. Program Logic 1355 may be the same logic 1205 on memory 1204 loaded on processor 1203 in FIG. 12. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-13. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing backups in a distributed data storage system including one or more zones which includes a first zone, a second zone, and a third zone, the computer-executable method comprising:
   providing access to a first portion of data from the first zone, a second portion of data from the second zone, and a third portion of data from the third zone;
   processing, at the third zone, the first portion of data of the first zone and the second portion of data of the second zone to create a combined portion of data, wherein the first zone, the second zone, and the third zone exist in separate locations, wherein each zone includes one or more data storage arrays;
   wherein the first zone manages a primary backup of the first portion of data within the first zone and the second zone manages a primary backup of the second portion of data within the second zone; and
   removing the first portion of data of the first zone and the second portion of data of the second zone from the third zone, to reduce an amount of backup data stored, wherein the processing comprises: executing an exclusive or (XOR) operation on the first portion of data of the first zone and the second portion of data of the second zone, wherein the combined portion of data is the first portion of data of the first zone XOR the second portion of data of the second zone.

2. The computer-executable method of claim 1, further comprising:
   receiving a request for the first portion of data, wherein a failure event has occurred at the first zone;
   retrieving the second portion of data from the second zone; and
   processing the second portion of data and the combined portion of data to restore the first portion of data.

3. The computer-executable method of claim 2, wherein the failure event comprises losing an ability to communicate with the first zone.

4. The computer-executable method of claim 2, further comprising responding to the request for the first portion of data.

5. The computer-executable method of claim 1, wherein the first zone includes one or more compute nodes and one or more data storage arrays.

6. A system, comprising:
   a distributed data storage system including one or more zones which includes a first zone, a second zone, and a third zone; and
   computer-executable program logic encoded in memory of one or more computers in communication with the distributed data storage system to enable management of backups in the distributed data storage system, wherein the computer-executable program logic is configured for the execution of:
   providing access to a first portion of data from the first zone, a second portion of data from the second zone, and a third portion of data from the third zone;
   processing, at the third zone, the first portion of data of the first zone and the second portion of data of the second zone to create a combined portion of data, wherein the first zone, the second zone, and the third zone exist in separate locations, wherein each zone includes one or more data storage arrays;
   wherein the first zone manages a primary backup of the first portion of data within the first zone and the second zone manages a primary backup of the second portion of data within the second zone; and
   removing the first portion of data of the first zone and the second portion of data of the second zone from the third zone, to reduce an amount of backup data stored, wherein the processing comprises: executing an exclusive or (XOR) operation on the first portion of data of the first zone and the second portion of data of the second zone, wherein the combined portion of data is the first portion of data of the first zone XOR the second portion of data of the second zone.

7. The system of claim 6, wherein the computer-executable program logic is further configured for the execution of:
   receiving a request for the first portion of data, wherein a failure event has occurred at the first zone;
   retrieving the second portion of data from the second zone; and
   processing the second portion of data and the combined portion of data to restore the first portion of data.

8. The system of claim 7, wherein the failure event comprises losing an ability to communicate with the first zone.

9. The system of claim 7, wherein the computer-executable program logic is further configured for the execution of responding to the request for the first portion of data.

10. The system of claim 6, wherein the first zone includes one or more compute nodes and one or more data storage arrays.

11. A non-transitory computer-readable storage medium, comprising
- computer executable program code for managing backups in a distributed data storage system including one or more zones which includes a first zone, a second zone, and a third zone, the computer-executable program code configured to enable the execution of:
- providing access to a first portion of data from the first zone, a second portion of data from the second zone, and a third portion of data from the third zone;
- processing, at the third zone, the first portion of data of the first zone and the second portion of data of the second zone to create a combined portion of data, wherein the first zone, the second zone, and the third zone exist in separate locations, wherein each zone includes one or more data storage arrays;
- wherein the first zone manages a primary backup of the first portion of data within the first zone and the second zone manages a primary backup of the second portion of data within the second zone; and
- removing the first portion of data of the first zone and the second portion of data of the second zone from the third zone, to reduce an amount of backup data stored, wherein the processing comprises: executing an exclusive or (XOR) operation on the first portion of data of the first zone and the second portion of data of the second zone, wherein the combined portion of data is the first portion of data of the first zone XOR the second portion of data of the second zone.

12. The non-transitory computer-readable storage medium of claim 11, wherein the code is further configured to enable the execution of:
- receiving a request for the first portion of data, wherein a failure event has occurred at the first zone;
- retrieving the second portion of data from the second zone; and
- processing the second portion of data and the combined portion of data to restore the first portion of data.

13. The non-transitory computer-readable storage medium of claim 12, wherein the failure event comprises losing an ability to communicate with the first zone.

14. The non-transitory computer-readable storage medium of claim 12, wherein the code is further configured to enable the execution of responding to the request for the first portion of data.

15. The non-transitory computer-readable storage medium of claim 11, wherein the first zone includes one or more compute nodes and one or more data storage arrays.

* * * * *